(12) United States Patent
Cruz et al.

(10) Patent No.: US 10,949,652 B1
(45) Date of Patent: Mar. 16, 2021

(54) ATM TRANSACTION SECURITY USING FACIAL DETECTION

(71) Applicant: Capital One Services, LLC, McLean, VA (US)

(72) Inventors: Ana Cruz, Arlington, VA (US); Vincent Pham, Champaign, IL (US); Nahid Farhady Ghalaty, Fairfax, VA (US); Christopher Camenares, Falls Church, VA (US); Lee Adcock, Midlothian, VA (US); Jason Yl, Arlington, VA (US); Geeta Shyamala, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 1 day.

(21) Appl. No.: 16/678,807

(22) Filed: Nov. 8, 2019

(51) Int. Cl.
*G06K 9/00* (2006.01)
*G07F 19/00* (2006.01)
*G06F 21/32* (2013.01)

(52) U.S. Cl.
CPC ......... *G06K 9/00288* (2013.01); *G06F 21/32* (2013.01); *G06K 9/00228* (2013.01); *G06K 9/00268* (2013.01); *G06K 9/00885* (2013.01); *G07F 19/207* (2013.01); *G07F 19/209* (2013.01)

(58) Field of Classification Search
CPC ........... G06K 9/00288; G06K 9/00885; G06K 9/00228; G06K 9/00268; G07F 19/209; G07F 19/207; G06F 21/32
See application file for complete search history.

(56) References Cited

U.S. PATENT DOCUMENTS

| | | | |
|---|---|---|---|
| 8,494,961 B1 * | 7/2013 | Lucas | G06Q 20/1085 705/35 |
| 8,881,251 B1 * | 11/2014 | Hilger | H04L 63/083 713/183 |
| 10,269,016 B2 | 4/2019 | Votaw et al. | |
| 10,303,869 B1 | 5/2019 | Duke et al. | |
| 2014/0015930 A1 * | 1/2014 | Sengupta | G06F 21/32 348/46 |
| 2016/0063503 A1 | 3/2016 | Kobres et al. | |
| 2016/0224824 A1 * | 8/2016 | Yamada | G06K 9/00234 |
| 2019/0044942 A1 | 2/2019 | Gordon et al. | |

* cited by examiner

*Primary Examiner* — Chan S Park
*Assistant Examiner* — Elisa M Rice
(74) *Attorney, Agent, or Firm* — Sterne, Kessler, Goldstein & Fox, P.L.L.C.

(57) ABSTRACT

Disclosed herein are system, method, and computer program product embodiments for securing ATM transactions based on facial detection. The approach contemplates performing facial detection on an image of a user of an ATM when the user authenticates themselves, and comparing the user's detected face to facial detection results of subsequent images taken at the ATM. Based on this comparison, various security events may be detected and, for any given security event, a particular action may be taken.

30 Claims, 5 Drawing Sheets

ATM TRANSACTION SECURITY USING FACIAL DETECTION

BACKGROUND

Automated Teller Machines (ATMs) are frequently targets for thieves. In particular, thieves anticipate that someone approaching an ATM will typically be making a cash withdrawal, making that person a prime target for theft. Typical solutions to reducing theft include placing ATMs only in well-lit areas with heavy foot traffic, as well as using cameras as a deterrent.

Prior solutions may also look for an ATM user to be present in front of the ATM during initialization of a transaction, and to remain in front of the ATM for the duration of the transaction. However, these approaches suffer from a lack of flexibility in detecting specific scenarios, and in their ability to respond dynamically to those scenarios.

Thieves will remain undeterred in many situations. Additional approaches to mitigating the risk of ATM usage are needed.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing ATM security using facial detection.

Because ATMs are a prime target for thieves, banks typically take steps to ensure the security of their customers interacting with their ATMs. For example, banks often include video cameras on their ATMs, which can be reviewed after an incident to determine the circumstances of the incident—perhaps to identify a suspect in a theft. Such video has a deterrent effect, keeping potential thieves away from ATMs due to the risk of identification and later arrest for their crime.

However, if a thief is nevertheless undeterred by these passive security measures at an ATM, such a thief may be emboldened to strike at the ATM itself. In this scenario, the thief may approach a victim at an ATM (or direct a victim to an ATM) where the victim begins a transaction with the ATM. Once the victim has accessed their account, typically by inserting their ATM card and entering their authentication information (e.g., a personal identification number (PIN)), the thief takes over and makes a withdrawal.

Such a theft may net the thief significantly more money than they would have been able to obtain by approaching the victim after they concluded their regular transaction. This is because the victim would typically withdraw only a smaller amount that they needed, even though they have additional funds in their account.

Active measures against such types of theft are limited. Apart from placing security guards near the ATM, or actively monitoring cameras, not much else is typically done. Banks do look for potentially fraudulent transactions as they occur and flag them for suspicious behavior (or decline them in real time), but this layer simply looks for patterns in the victim's typical banking behavior.

Figure 1:
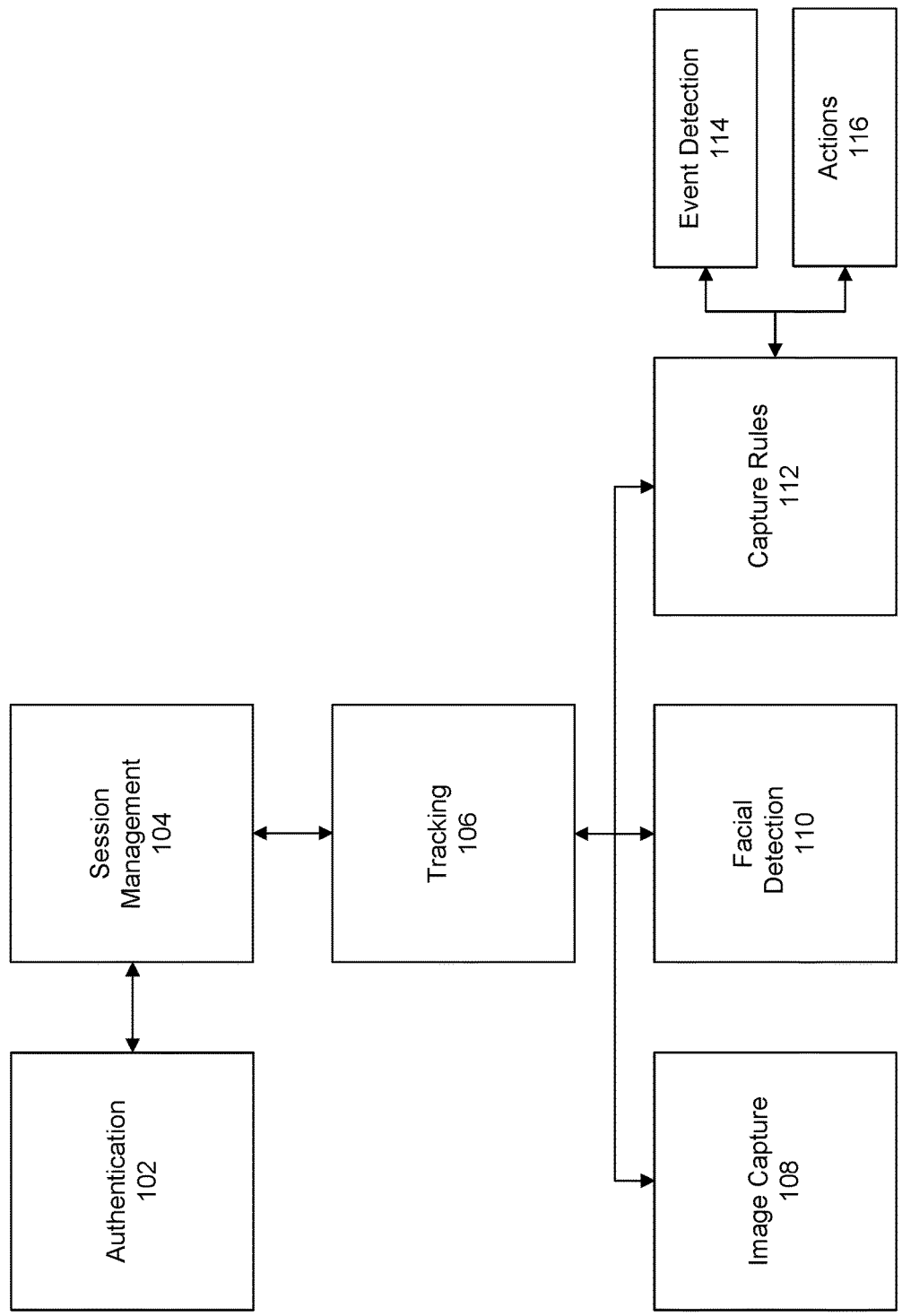
FIG. 1 is a diagram of an ATM facial detection system, in accordance with an embodiment.

FIG. 1 is a diagram of an ATM facial detection system 100, in accordance with an embodiment. ATM facial detection system 100 is disposed within an ATM. A skilled artisan will further appreciate that while modules of ATM facial detection system 100 are shown as individual unified modules in FIG. 1, this is for purposes of example and discussion, and not limitation. For the various modules described throughout this disclosure, the modules may consist of various local sub-modules, or may be wholly or partially distributed through remote systems, including cloud-based systems.

Under normal operation, an ATM user will approach the ATM to perform a transaction. To interact with their bank account through the ATM, the user must authenticate themselves to the ATM. Typically, this involves authentication through the use of a physical ATM card together with entry of a PIN by the user (a form of two-factor authentication, with something the user has (the card) and something the user knows (the PIN)). This authentication process is handled by authentication module 102, in accordance with an embodiment. A skilled artisan will appreciate that other authentication approaches may be used. These approaches may be single- or multi-factor authentication approaches.

Once a user is authenticated to the ATM through authentication module 102, control is turned over to a session management module 104. The session management module 104 handles all aspects of a user's authenticated session, including offering the ability to perform a cash withdrawal to a user, and actually performing the cash withdrawal if requested by the user. While a session remains active within session management module 104, the user may continue to transact with the ATM under the auspices of the original authentication.

So far, this is a typical operation of an ATM. And, at this point, if a thief were to intervene and take control of the ATM, they would have control of the active session run by session management module 104. The thief would therefore have access to all of the same possible transactions as the user, without having to go through the authentication process of authentication module 102.

However, in an embodiment, an ATM employing ATM facial detection system 100 includes a tracking module 106. Tracking module 106 is designed to ensure that the user authenticated to authentication module 102 is the same user who remains in control of a session run by session management module 104 throughout the duration of the session. Tracking module 106 accomplishes this by performing facial detection on the user through a camera. In accordance with an embodiment, the camera is disposed on the ATM and directed at a position in front of the ATM, such that the user (or any other user of the ATM) would be centrally positioned within an image frame captured by the camera when the user is actively interacting with the ATM.

A skilled artisan will recognize that positioning of the camera used by tracking module 106 may be accomplished in various different ways, which may improve facial detection functionality. The camera may, for example, have a narrow field of view to ensure that only the area directly in front of the ATM is captured where the user's face would be expected to be present during interaction with the ATM.

To perform facial detection, and to provide ATM security based on the facial detection, tracking module 106 interacts with several additional modules. In an embodiment, image capture module 108 interfaces with the camera directly to capture images (or, similarly, video frames—used interchangeably herein) for processing by tracking module 106. These images can be passed to facial detection module 110 for facial detection processing.

Facial detection module 110 may, in accordance with an embodiment, inform tracking module 106 whether a face present in any given image captured by image capture module 108 is a new face, a previously seen face, or even whether the image does not have a face within it. In a further embodiment, facial detection module 110 may detect multiple faces within a single image.

Facial detection module 110 may perform facial detection according to a number of techniques that would be known to a skilled artisan, including traditional techniques such as principal component analysis using eigenfaces, linear discriminant analysis, elastic bunch graph matching, hidden Markov models, multilinear subspace learning, and dynamic link matching. Facial detection module 110 may also be adapted to work on multiple images (e.g., from multiple cameras disposed in a 3D sensor arrangement) to perform 3D face detection. Facial detection module 110 may also perform other forms of analysis, including techniques used in facial recognition, such as skin texture analysis, or combine various facial detection and/or recognition techniques. Facial detection module 110 may further work on various types of images, including thermal images from a thermal camera, by way of non-limiting example. Additionally, facial detection module 110 may check for several event conditions, such as where the image lacks any faces, or where the image has multiple faces.

Based on the facial detection information provided by facial detection module 110, tracking module 106 may identify different security situations, some of which may require action by the ATM or a third party. In accordance with an embodiment, tracking module 106 interfaces with capture rules module 112 to determine whether a particular security situation has occurred, and if so, how to respond.

Capture rules module 112 provides an exemplary, non-limiting approach for responding to various facial detection scenarios, in accordance with an embodiment. As shown in FIG. 1, capture rules module 112 interfaces with an event detection module 114 and an actions module 116. Event detection module 114 identifies various events that take place with respect to facial detection module 110, while actions module 116 provides a set of actions to take for a given event or sequence of events identified by event detection module 114.

A skilled artisan will appreciate that capture rules module 112, as well as event detection module 114 and actions module 116, may be substituted for other mechanisms for identifying and responding to events, including but not limited to AI/machine learning based implementations or other adaptive approaches. Moreover, the various rules-based approaches described herein may be coupled with other rule or AI/machine learning approaches in other bank- or ATM-based systems to provide additional and improved actions (such as actions taken by actions module 116). For example, events detected by event detection module 114 may be weighed with transaction knowledge in a back-end system (e.g., considering transaction behavior of a user authenticated to the session) to determine an appropriate action. Accordingly, a description of events and actions disclosed herein should not be read as limiting the scope of considerations accounted for at any step.

Figure 2:
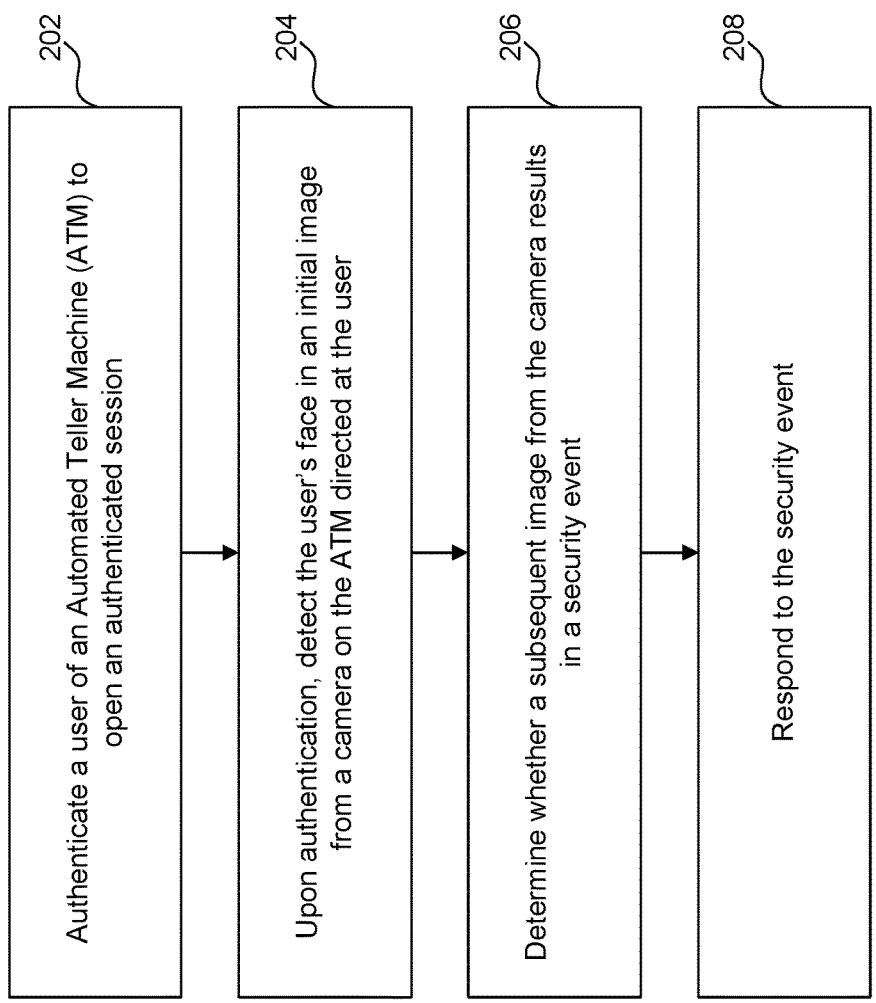
FIG. 2 is a flowchart illustrating steps by which the ATM facial detection system operates, in accordance with an embodiment.

FIG. 2 is a flowchart 200 illustrating steps by which the ATM facial detection system operates, in accordance with an embodiment. The process begins at step 202 where a user is authenticated to an ATM to open an authenticated session. As previously described, this may be performed by a user authenticating to authentication module 102 of FIG. 1 and being assigned an (authenticated) session by session management module 104 of FIG. 1.

At step 204, the user's face is detected in an initial image from a camera on the ATM, in accordance with an embodiment. As previously described, the camera (which may be physically located on the ATM itself) is directed generally toward a position in front of the ATM where the user's face would be expected to be found while the user is interacting with the ATM. An image (as an image still or as a frame of a video, used interchangeably herein) is captured by the camera at the time the user authenticates to the ATM (such as by image capture module 108 of FIG. 1).

By capturing the user's face at the point of authentication, facial detection may be performed (such as by facial detection module 110 of FIG. 1) to associate the user's face with the authenticated session. By way of non-limiting example, associating the user's face with the authenticated session may include storing or otherwise holding the user's face in memory while the authenticated session is active. The exact timing at which the user's face is captured relative to the point of authentication need not be fixed to satisfy the goal of ensuring that facial detection is performed specifically on the user's face corresponding to the user of the authenticated session, and other approaches are contemplated. For example, the user's face may be captured at the point of partial authentication, such as when the user inserts their ATM card into the ATM, but before a second level of authentication (such as a PIN) has been confirmed. In an embodiment, the precise parameters for capture are settable by an administrator of the ATM.

With the user's face detected and associated with the user's authenticated session, the process proceeds to step 206 where a determination is made as to whether a subsequent image captured from the camera results in a security event, and, if so, a response is made to the security event at step 208.

Figure 3:
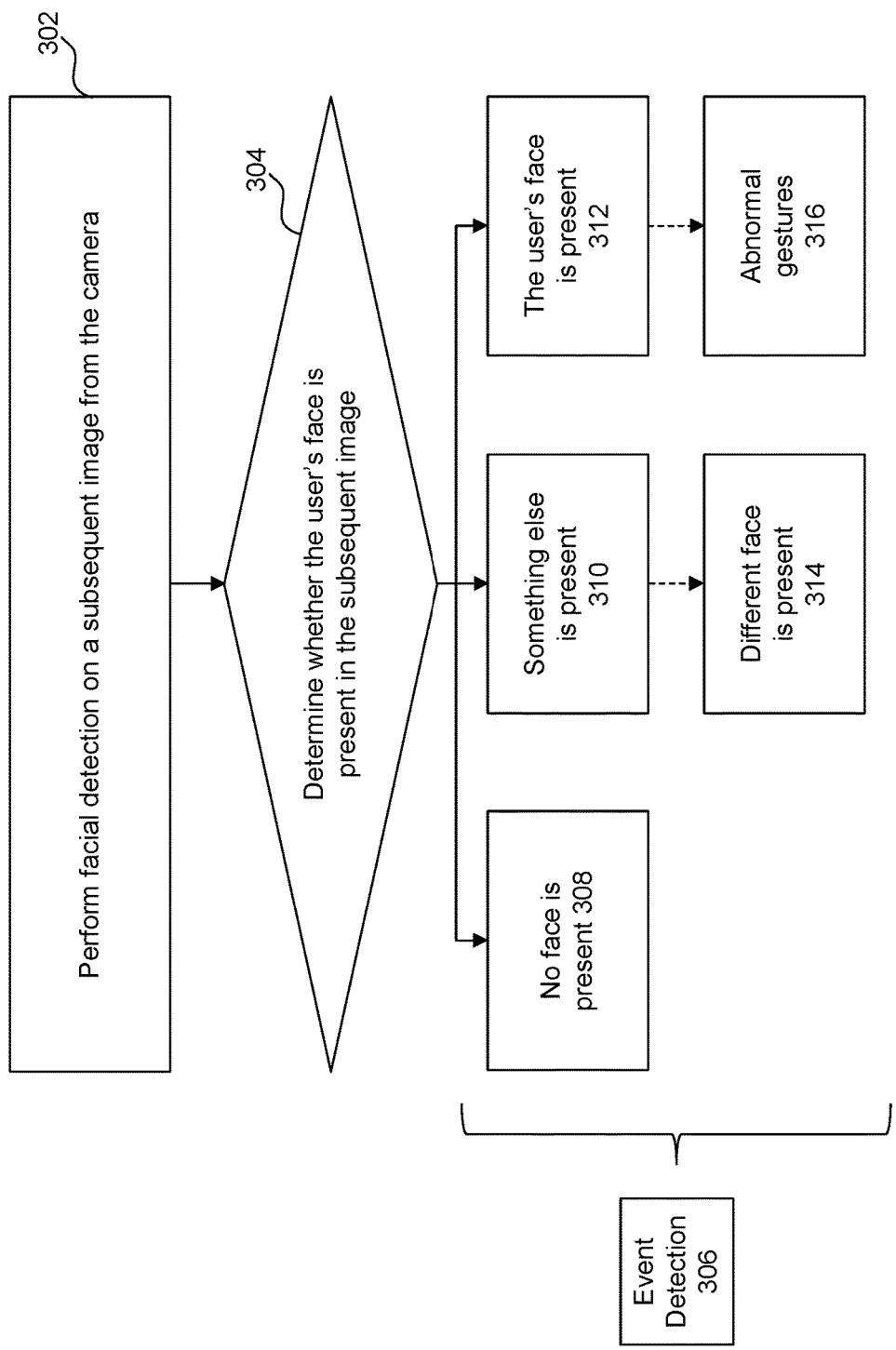
FIG. 3 is a flowchart illustrating steps by which security events are detected in the ATM facial detection system, in accordance with an embodiment.

FIG. 3 is a flowchart 300 illustrating steps by which security events are detected in the ATM facial detection system, in accordance with an embodiment. Flowchart 300 begins with the assumption that facial detection has been performed on an initial image, such that an ATM user's face has been detected and associated with the user's authenticated session. Flowchart 300 expands on the determining of step 206 in FIG. 2, in accordance with an embodiment.

At step 302, a subsequent image (or video frame) is received from a camera. As previously discussed, this image may be obtained by tracking module 106 of FIG. 1 through interaction with image capture module 108 of FIG. 1, in accordance with an embodiment. Also at step 302, facial detection is performed on the subsequent image, such as by facial detection module 110 of FIG. 1.

At step 304, a determination is made as to whether the user's face is present in the subsequent image, in accordance with an embodiment. By way of non-limiting example, this determination may require recognition of the user's face (the same face that was previously present during authentication) somewhere in the subsequent image using facial recognition techniques. However, in other exemplary embodiments, the user's face may be required to be located within a specific region of the subsequent image.

Based on the determination of step 304, one of several events may be detected at step 306, as shown in FIG. 3. Detecting these events may be handled by, for example, capture rules module 112 of FIG. 1 interfacing with events detection module 114 of FIG. 1.

In accordance with an embodiment, events detection module 114 may be modified by an administrator to specify events in addition to, or instead of, the events shown in FIG. 3. In accordance with a further embodiment, the events shown in FIG. 3 (i.e., events 308, 310, 312, 314, and 316) are pre-configured.

Events detection step 306 uses the facial detection result on the subsequent image to identify different possible events that may have occurred, and these events may trigger certain actions to occur (as per step 208 of FIG. 2 and actions module 116 of FIG. 1). For example, if the user's face is present in the subsequent image (step 312), then a certain action may be taken (including 'no action' as a possible action—if the user of the authenticated session remains in direct view of the camera, a possible result is that no security issue has occurred and the transaction should be allowed to proceed).

Other events include, for example, the detection of the user's face in step 312, but with the user making some sort of abnormal gesture detected at step 316. For example, the user's face may be present in the subsequent image, but may be looking away from the camera or the ATM. In a further embodiment, the abnormal gesture may be determined by way of an additional sensor besides the camera, such as sensors to detect sweating or abnormal body heat from the user.

As another possible set of events, the determining step 304 may find that the user's face is not present. In step 308, an event may occur where no face is present at all in the subsequent image (which may be detected using facial detection techniques). In another case, something else may be present at step 310 (for example, the camera's view may be obstructed), and in one particular case the 'something else' may be a different face detected at step 314.

In the foregoing example, the event where no face at all is present in the subsequent image (step 308) and the event where a different face than the user's face is detected in the subsequent image (step 314), maintaining these situations as separate events is advantageous in providing the ability to respond differently to each. As discussed further below with respect to actions, treating these situations as separate events allows for one action (e.g., locking out the ATM until the user's face returns to view, or terminating the session on the assumption that the user has walked away from the ATM without signing out—approaches that provide peace of mind for customers knowing that their account is secured) for the possibly lower danger situation where the user has stepped out of view, and a separate action (e.g., sounding an alarm or notifying emergency services) for the possibly higher danger situation where a second face is in view instead of the user.

Figure 4:
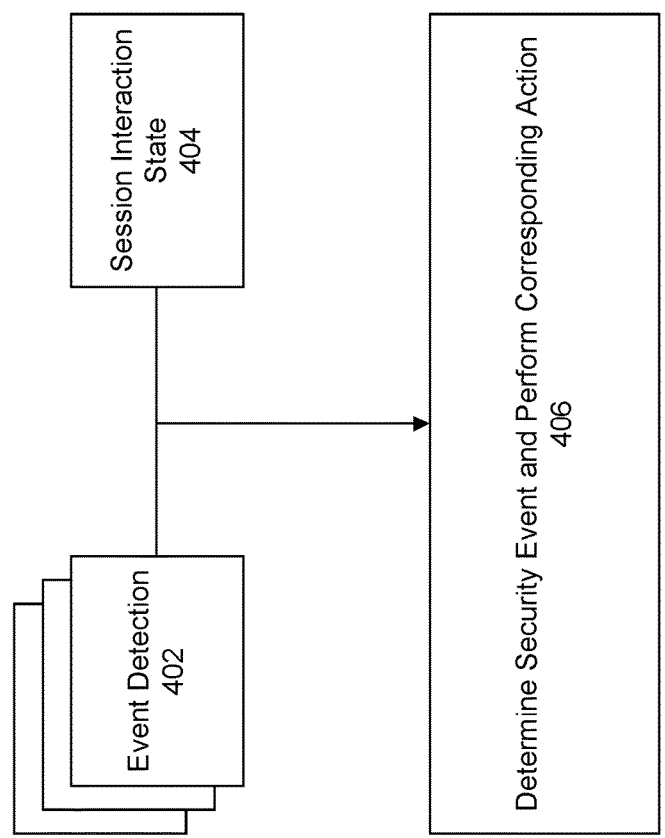
FIG. 4 is a flowchart illustrating steps by which security actions may be performed, in accordance with an embodiment.

FIG. 4 is a flowchart 400 illustrating steps by which security actions may be performed, in accordance with an embodiment. As illustrated in flowchart 400, event detection 402 is performed to determine a particular event that has occurred. In accordance with an embodiment, determining the event per event detection 402 is performed in accordance with flowchart 300 of FIG. 3, although other approaches to detecting an event based on the user's detected face and subsequent images is contemplated within the scope of this disclosure.

Separately, the state of interaction with the authenticated session is determined at step 404. Possible interaction states include, but are not limited to, state information regarding whether a keypad of the ATM is or is not presently being interacted with, whether a touchscreen of the ATM is or is not presently being interacted with, whether the authenticated session has been active within a past time period (e.g., within the past 30 seconds), a stage of a transaction with the ATM (e.g., a withdrawal has been requested but an amount has not yet been entered, etc.), among other possibilities.

At step 406, the event identified at step 402 (and optionally the session interaction state identified at step 404) are considered to perform a responsive action. Turning to FIG. 1, capture rules module 112 takes an event identified by event detection module 114 and maps it (using, e.g., rules-based mapping) to a particular action performed by actions module 116. This allows for a specific response to any identified event.

In accordance with an embodiment, an administrator may modify the mappings from events to actions. For example, a predefined set of actions may be present, and the administrator may choose a specific action to take for any given event. Additionally, the administrator may be permitted to code additional actions, which in turn may be mapped to any given event (including additionally coded events). Furthermore, the mappings may account for the particular state of a session, leading to actions being taken based on no faces present in the subsequent image yet someone is interacting with the keypad or touchscreen of the ATM.

Some actions may include, for example, updating a state of the authenticated session, such as by terminating the session (e.g., tracking module 106 of FIG. 1 may notify session management module 104 of FIG. 1 to terminate the active authenticated session), contacting an attendant, contacting an emergency service, sounding an alarm, locking down doors in a room where the ATM is located, or sending the subsequent image to law enforcement or other authority. Additionally, an action may be 'no action,' where an event is deemed not to require a response.

These approaches allow for the detection, and interference with, possible theft attempts. For example, a different face from the user's face being detected in a subsequent image could be an indicator that a thief has taken the user's place at the ATM. In this case, action could be taken to sound an alarm to attempt to scare off the thief. If the thief also begins interacting with the ATM while their face is in view of the camera, this event could trigger a separate action such as calling emergency services.

Figure 5:
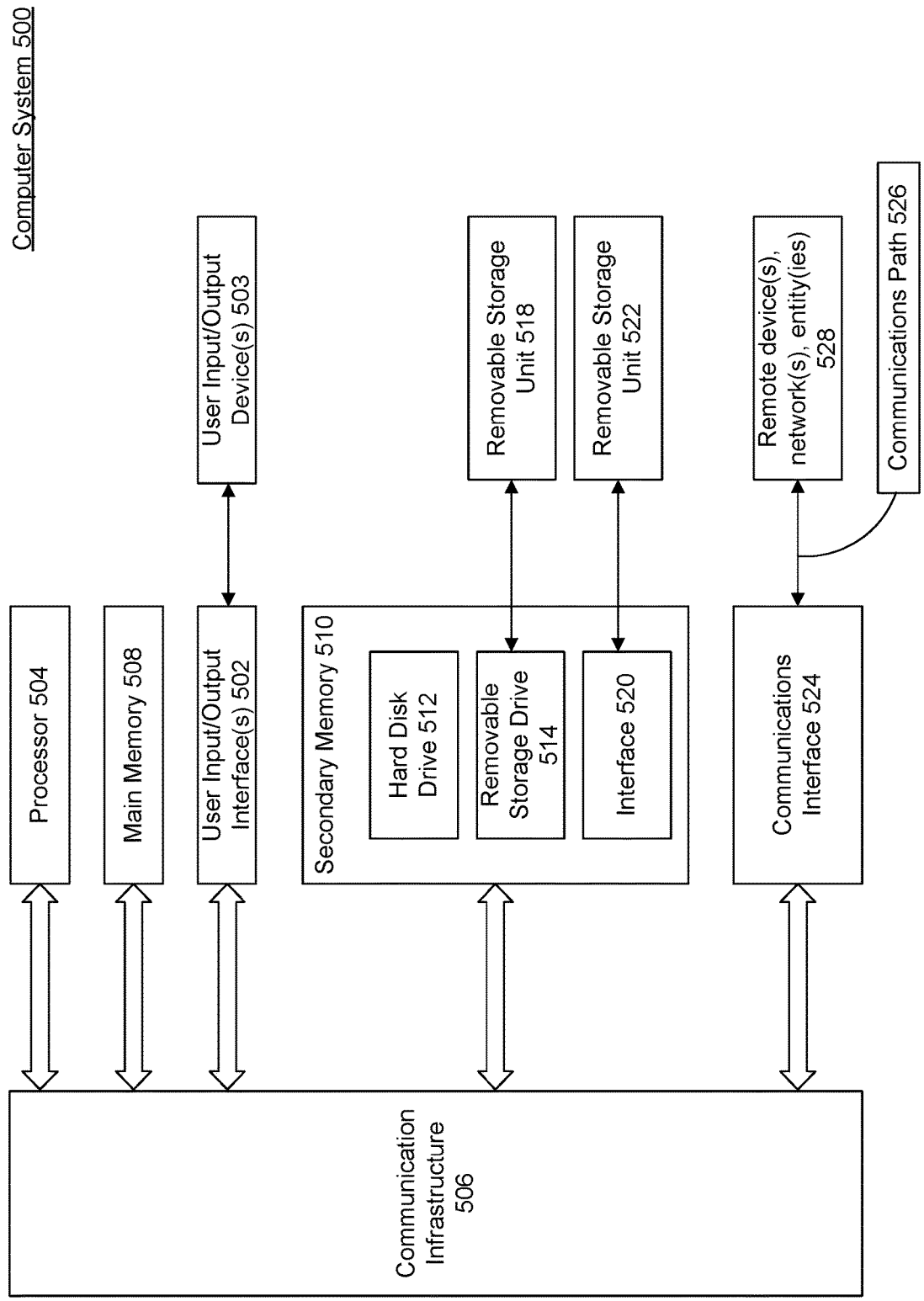
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   capturing, by one or more computing devices, responsive to authentication of a session with an Automated Teller Machine (ATM), one or more first images from a camera disposed on the ATM, at the time the authentication of the session is completed;
   performing facial detection, by the one or more computing devices, on the one or more first images to obtain a first facial detection result comprising a first detected face;
   associating, by the one or more computing devices, the first detected face with the authenticated session, wherein the first detected face is held in memory while the authenticated session remains active;
   capturing, by the one or more computing devices, one or more second images from the camera during the authenticated session;
   performing facial detection, by the one or more computing devices, on the one or more second images to obtain a second facial detection result;
   detecting a security event, by the one or more computing devices, by comparing the second facial detection result to the first facial detection result; and
   updating, by the one or more computing devices, a state of the authenticated session based on the detected security event.

2. The computer implemented method of claim 1, wherein the second facial detection result comprises a determination that no face is present in the one or more second images.

3. The computer implemented method of claim 1, wherein updating the state of the session based on the detected security event comprises:
   interrupting the session.

4. The computer implemented method of claim 1, wherein updating the state of the session based on the detected security event comprises:
   updating the state of the session using an action assigned to the security event.

5. The computer implemented method of claim 4, further comprising:
   assigning, by the one or more computing devices, the action to the security event from a set of actions.

6. The computer implemented method of claim 4, wherein the action assigned to the security event includes one or more actions from a set of actions comprising:
   terminating the session,
   contacting an attendant,
   contacting an emergency service,
   sounding an alarm,
   locking a door, and
   sending at least one of the one or more second images to an authority.

7. The computer implemented method of claim 1, wherein updating the state of the session is further based on detecting interaction with the ATM during the security event.

8. The computer implemented method of claim 1, wherein the second facial detection result comprises a second detected face different from the first detected face.

9. The computer implemented method of claim 8, wherein updating the state of the session based on the detected security event comprises:
   updating the state of the session using an action assigned to detection of the second detected face different from the first detected face.

10. The computer implemented method of claim 8, wherein updating the state of the session is further based on detecting interaction with the ATM during the security event.

11. A computer readable storage device having instructions stored thereon, execution of which, by one or more processing devices, causes the one or more processing devices to perform operations comprising:
   capturing, responsive to authentication of a session with an Automated Teller Machine (ATM), one or more first images from a camera disposed on the ATM, at the time the authentication of the session is completed;
   performing facial detection on the one or more first images to obtain a first facial detection result comprising a first detected face;
   associating the first detected face with the authenticated session, wherein the first detected face is held in memory while the authenticated session remains active;
   capturing one or more second images from the camera during the authenticated session;
   performing facial detection on the one or more second images to obtain a second facial detection result;
   detecting a security event by comparing the second facial detection result to the first facial detection result; and
   updating a state of the authenticated session based on the detected security event.

12. The computer readable storage device of claim 11, wherein the second facial detection result comprises a determination that no face is present in the one or more second images.

13. The computer readable storage device of claim 11, wherein the authentication of the session comprises a first level of authentication that occurs prior to a second level of authentication.

14. The computer readable storage device of claim 11, wherein updating the state of the session based on the detected security event comprises:
 updating the state of the session using an action assigned to the security event.

15. The computer implemented method of claim 14, further comprising:
 assigning, by the one or more computing devices, the action to the security event from a set of actions.

16. The computer readable storage device of claim 11, wherein updating the state of the session is further based on detecting interaction with the ATM during the security event.

17. The computer readable storage device of claim 11, wherein the second facial detection result comprises a second detected face different from the first detected face.

18. A computer implemented method, comprising:
 performing facial detection, by one or more computing devices and responsive to completion of an authentication process for a session with an Automated Teller Machine (ATM), on one or more first images from a camera disposed on the ATM to obtain a first facial detection result, wherein the first facial detection result comprises a first detected face;
 associating, by the one or more computing devices, the first detected face with the authenticated session, wherein the first detected face is held in memory while the authenticated session remains active;
 performing facial detection, by the one or more computing devices, on one or more second images from the camera to obtain a second facial detection result;
 detecting a security event, by the one or more computing devices, by comparing the second facial detection result with the first facial detection result; and
 updating, by the one or more computing devices, a state of the authenticated session based on the detected security event.

19. The computer implemented method of claim 18, wherein the second facial detection result comprises a determination that no face is present in the one or more second images.

20. The computer implemented method of claim 18, wherein updating the state of the session comprises interrupting the session.

21. The computer implemented method of claim 18, wherein updating the state of the session based on the detected security event comprises:
 updating, by the one or more computing devices, the state of the session using an action assigned to the security event.

22. The computer implemented method of claim 21, wherein the action assigned to the security event includes one or more actions from a set of actions comprising:
 terminating the session,
 contacting an attendant,
 contacting an emergency service,
 sounding an alarm,
 locking a door, and
 sending one or more images from the camera to an authority.

23. The computer implemented method of claim 18, wherein updating the state of the session is further based on detecting interaction with the ATM during the security event.

24. The computer implemented method of claim 18, wherein the second facial detection result comprises a second detected face different from the first detected face.

25. A computer readable storage device having instructions stored thereon, execution of which, by one or more processing devices, causes the one or more processing devices to perform operations comprising:
 performing facial detection, responsive to completion of an authentication process for a session with an Automated Teller Machine (ATM), on one or more first images from a camera disposed on the ATM to obtain a first facial detection result, wherein the first facial detection result comprises a first detected face;
 associating the first detected face with the authenticated session, wherein the first detected face is held in memory while the authenticated session remains active;
 performing facial detection on one or more second images from the camera to obtain a second facial detection result;
 detecting a security event by comparing the second facial detection result with the first facial detection result; and
 updating a state of the authenticated session based on the detected security event.

26. The computer readable storage device of claim 25, wherein the second facial detection result comprises a determination that no face is present in the one or more second images.

27. The computer readable storage device of claim 25, wherein updating the state of the session based on the detected security event comprises:
 updating the state of the session using an action assigned to the security event.

28. The computer readable storage device of claim 27, wherein the action assigned to the security event includes one or more actions from a set of actions comprising:
 interrupting the session,
 terminating the session,
 contacting an attendant,
 contacting an emergency service,
 sounding an alarm,
 locking a door, and
 sending one or more images from the camera to an authority.

29. The computer readable storage device of claim 25, wherein updating the state of the session is further based on detecting interaction with the ATM during the security event.

30. The computer readable storage device of claim 25, wherein the second facial detection result comprises a second detected face different from the first detected face.

* * * * *